United States Patent [19]
Vihma

[11] 3,851,415
[45] Dec. 3, 1974

[54] PICTURE FRAME

[75] Inventor: Johannes Vihma, Toronto, Ontario, Canada

[73] Assignee: Artistic Woodwork Co. Ltd., Ontario, Canada

[22] Filed: Aug. 1, 1973

[21] Appl. No.: 384,457

[52] U.S. Cl. ............................................. 40/152
[51] Int. Cl. ............................................. G09f 1/12
[58] Field of Search .................. 40/152, 152.1, 155; 52/753 D, 758 H, 656

[56] References Cited
UNITED STATES PATENTS

| | | | |
|---|---|---|---|
| 445,026 | 1/1891 | Phillips | 52/753 D X |
| 1,340,711 | 5/1920 | Greenwald | 40/152 X |
| 2,399,042 | 4/1946 | Klonaris | 52/753 X |
| 2,523,816 | 9/1950 | Roehrl | 40/156 |
| 2,581,843 | 1/1952 | Edwards | 40/156 X |

Primary Examiner—Robert W. Michell
Assistant Examiner—Wenceslao J. Contreras
Attorney, Agent, or Firm—Fetherstonhaugh & Co.

[57] ABSTRACT

A picture frame secured together in the required configuration by corner blocking members so as to eliminate the need for adhesive to secure the ends of adjacent frame moldings to one another. The structure is particularly suitable for use in the assembly of plastic frame molding members. The corner blocking members may be secured in a spaced relationship with respect to one another by means of spacer members which are secured to the corner blocking members. The corner blocking members are formed with end faces which are adapted to facilitate the securing of the corner blocking members to the spacer bar members.

10 Claims, 6 Drawing Figures

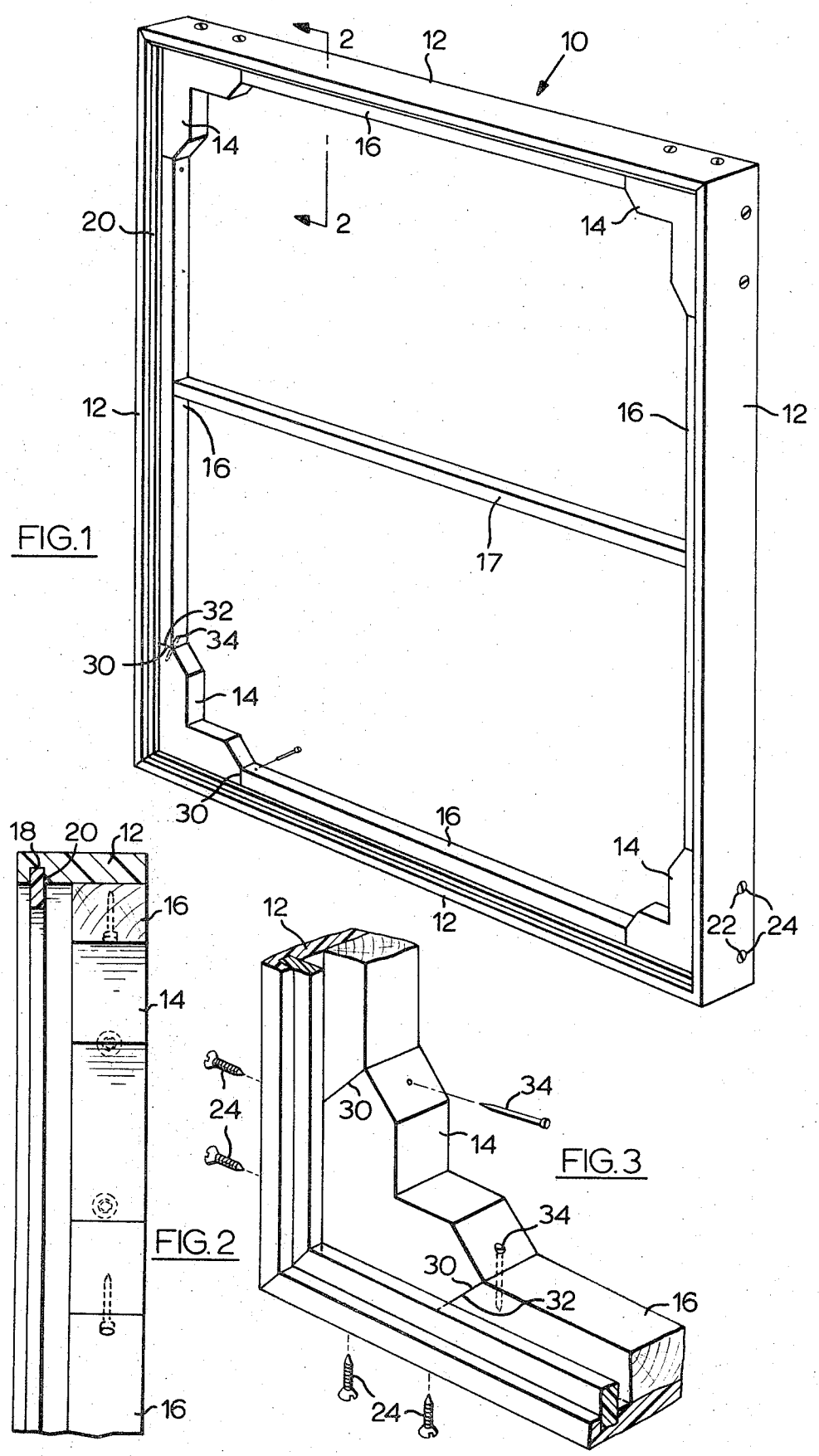

PATENTED DEC 3 1974  3,851,415
SHEET 2 OF 2
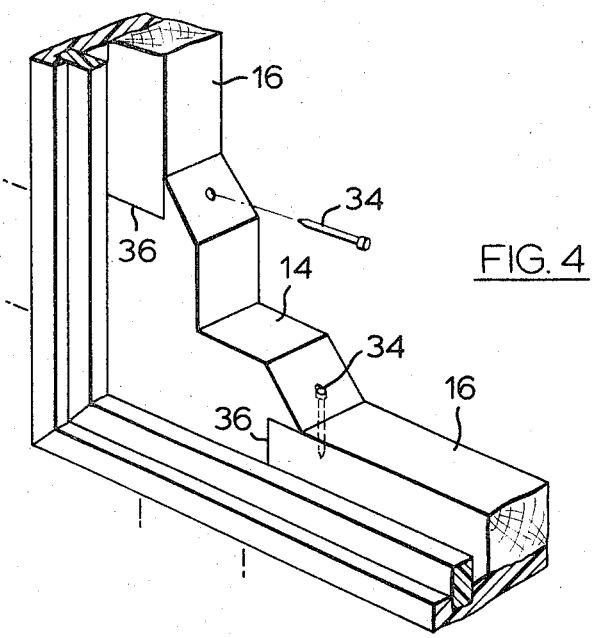
FIG. 4
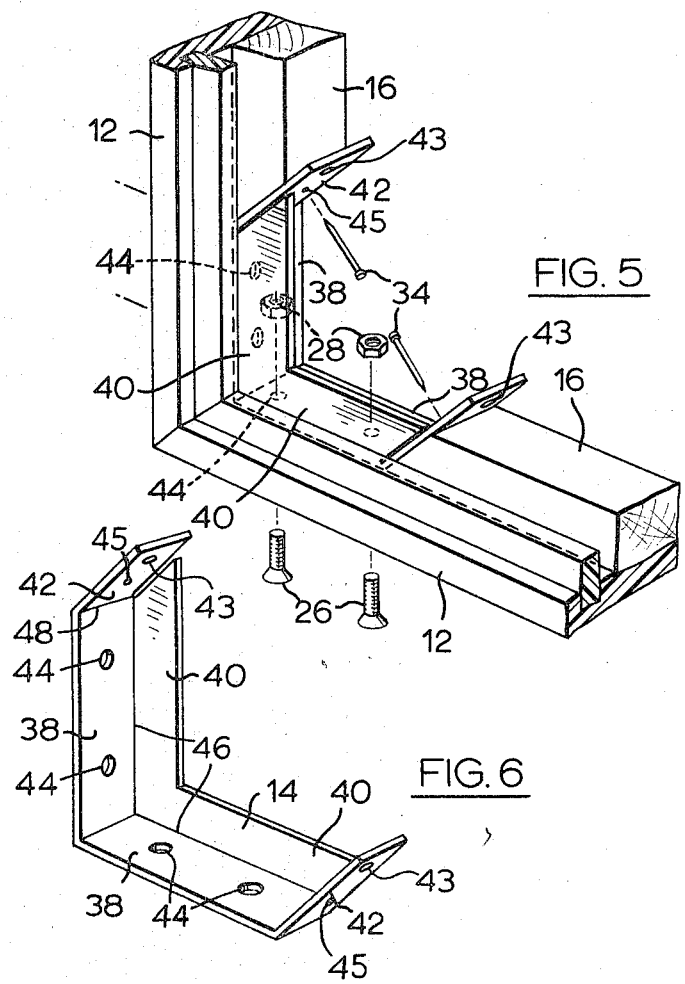
FIG. 5
FIG. 6

PICTURE FRAME

FIELD OF INVENTION

This invention relates to picture frames. In particular, this invention relates to picture frames having frame molding members which have a thickness of less than about one-half inch.

PRIOR ART

Picture frames are generally custom made to suit the size of the picture. The frame molding members are manufactured in long lengths which are cut to the required frame lengths to provide a mitred joint when the frame is assembled. In the manufacture of wooden frames the frame molding members are secured in the required configuration, generally rectangular, by means of finishing nails driven through the abutting corners or by means of a fastening device driven into the abutting corners.

With the introduction of thin plastic and metal picture frame moldings, difficulty has been experienced in securing the moldings with respect to one another in the required configuration. The practice which is presently employed requires the moldings to be adhesively bonded to one another at their abutting corners. The adhesive is required in view of the fact that it is not possible to nail the abutting ends of the molding to one another. Difficulty is experienced in achieving the required bond between the molding members and retaining the required frame configuration which, as previously indicated, is generally rectangular. In order to provide sufficient time to enable the adhesive to rigidly secure the molding members, it is necessary to clamp the frame in a jig. The use of jigs in the assembly of a frame is a costly procedure requiring a substantial number of jigs to permit a substantial rate of production of assembled frames. Furthermore, the abutting ends of the frame must be carefully located in their abutting relationship by means of the jig in order to achieve a satisfactory bond. Whereas in relatively thick sections of molding members it may be possible to bolt or otherwise secure the frame members by passing a threaded locking pin through the abutting ends of a plastic frame, it is not practical to employ this structure in many of the plastic frame molding members which have a relatively thin cross-section measuring less than about one-half inch.

SUMMARY OF INVENTION

The present invention overcomes the difficulties of the prior art described above and provides a simple and inexpensive picture frame which can be assembled with the aid of unskilled labour and without requiring a jig.

According to an embodiment of the present invention, a picture frame comprises a plurality of thin frame molding members disposed in an end to end abutting relationship to define the sides of said frame, lip means projecting inwardly from said picture frame molding members for supporting a picture thereon, corner blocking means at each corner of said frame spaced rearwardly from said lip means to secure a picture therebetween, and locking pin means extending through said molding members and releasably engaging said corner block members to releasably secure said molding members with respect to said block members and with respect to one another with the ends of said picture frame molding members in said abutting relationsip.

PREFERRED EMBODIMENT

The invention will be more clearly understood after reference to the following detailed specification read in conjunction with the drawings wherein:

FIG. 1 is a pictorial view of a picture frame according to an embodiment of the invention;

FIG. 2 is a sectional view in the direction of the arrow 2—2 of FIG. 1;

FIG. 3 is a partially sectioned pictorial view of a corner assembly according to an embodiment of the present invention;

FIG. 4 is a view similar to FIG. 3 illustrating a further embodiment of the invention;

FIG. 5 is a pictorial view similar to FIG. 3 illustrating a still further embodiment of the invention; and FIG. 6 is a pictorial view of the corner blocking member of FIG. 5.

With reference to the drawings, reference numeral 10 refers generally to a picture frame according to an embodiment of the present invention. The frame consists of a plurality of frame molding members 12, corner blocking members 14, spacer bar members 16. An additional spacer bar 17 may be provided to extend between oppositely disposed spacer bars 16 to support the frame when large frames are assembled to add rigidity to the frame. Each of the frame molding members 12 is formed with a rebate 18 which extends longitudinally thereof and a lip member 20 of a plastic material or the like has one edge rigidly secured within the rebate 18. The other edge of the lip member 20 projects from the molding inwardly of the frame to form a lip which serves to support the picture, picture glass or the like within the frame in use. The frame molding members may be made from a plastic material such as an acrylic plastic or nylon ot the like, or a light weight metal such as aluminium or the like.

The corner blocking member 14 may be made from wood as in the case of the embodiments illustrated in FIGS. 1 to 4 inclusive, or thin sheet metal such as sheet steel or the like as illustrated in FIGS. 5 and 6 of the drawings. The blocking members 14 may also be made from other materials including plastics such as nylon or celcon (trade mark, Celanese Plastics Company) or other synthetic meterials having similar physical and structural properties. The corner blocking members 14 each have a side wall disposed in a face-to-face abutting relationship with its adjacent frame molding member 12. The frame molding members 12 are formed with passages 22 which extend therethrough and the frame molding member is secured to the corner blocking member 14 by means of wood screws 24 in the embodiment wherein the blocking member 14 is made of wood and by means of set screws 26 and nuts 28 in the embodiment wherein the corner blocking member 14 is made of metal as illustrated in FIG. 5 of the drawings.

It will be apparent that the corner blocking members 14 may be used to secure the frame 10 in the required configuration without the need for the spacer members 16. The spacer members 16 have the advantage that they serve to further stabilize the structure of the assembled frame and they connect the corner blocking members 14 to one another in the form of a sub-frame which can be removed as a single unit.

In the embodiment illustrated in FIG. 1 of the drawings, the end faces 30 of the corner blocking members 14 and the end faces 32 of the spacer member 16 extend at right angles to the adjacent molding 12 and abut one another. A small finishing nail 34 is driven at an angle through the spacer member 16 into the corner blocking member 14 to secure the spacer member 16 with respect to the corner blocking member 14.

In the embodiment illustrated in FIG. 3 of the drawings, the end face 30 of the corner blocking member 14 and the end face 32 of the spacer bar 16 are angularly inclined so that a locking pin or nail 34 may be driven vertically through the corner blocking member 14 into the spacer member 16. This structure simplifies the connection of the corner blocking members 30 to the spacer members 16.

FIG. 4 of the drawings shows a further embodiment of the invention wherein the corner blocking members 14 are formed with a rebate 36 into which the ends of the spacers 16 are located to be secured therein by means of finishing nails 34. Again this structure facilitates the connection of the corner locking members 13 to the spacer members 16.

FIGS. 5 and 6 of the drawings illustrate a further embodiment of the invention wherein the corner blocking member 14 is in the form of a metal element having an L-shaped cross-section with outer walls 38 and inwardly projecting walls 40. End walls 42 are connected to the outer walls 38 and project inwardly therefrom at an angle to the plane of the walls 38. Passages 44 open through the walls 40 and passages 45 open through the end walls 42. The metal corner blocking member 14 is located in the position shown in FIG. 5 of the drawings with the inner walls 40 disposed in a face-to-face relationship with respect to its adjacent frame molding member 12. The corner blocking member 14 is secured to the frame molding members 12 by means of set screws 26 which pass through passages formed in the frame molding member 12 and the passages 44 formed in the corner blocking member 14. The set screws 26 are located in position by means of locking nuts 28. The corner blocking member 14 is rigidly located with respect to the spacer members 16 by means of nails 34 which are driven through the passage 45 formed in the end walls 42. The metal corner blocking members 14 have been found to be particularly well adapted for use in this application as they may be readily mass produced and are, therefore, relatively inexpensive. The metal corner blocking member 14 may be made from sheet metal suitably notched and folded along fold lines 46 and 48 to provide the required configuration. The end walls 42 project above the level of the inwardly projecting walls 40 and have additional passages 43 opening therethrough. A picture hanging wire may be strung between the passages 43 of adjacent corner blocking members so as to provide for the hanging of the picture. This is an important feature of the corner blocking elements of FIGS. 5 and 6 which facilitates the picture hanging.

To manufacture the frame according to the present invention, the length dimensions of the plastic frame molding members are determined and the plastic frame molding members are cut to the required lengths with their ends suitably angled to form the required mitred joint. The passages 22, which are preferably countersunk passages, are formed at each end of the plastic frame molding members, preferably with the aid of a drilling jig, which will accurately locate the press 22 with respect to the adjacent edges of the frame molding members. The corner blocking member 14 is then secured to the frame molding members by means of screws 24 or set screws 26, at each corner of the required frame configuration. If required, the spacer members 16 are then cut to a length suitable to extend between the corner blocking members 14 and secured thereto as previously described by means of pins 34.

The assembled sub-frame consisting of the corner blocking members 14 and spacer members 16 may then be removed by releasing the screws 24 so that a picture or a combination picture and picture frame glass may be located between the sub-frame and the lip 20 to be retained therein.

If desired, an adhesive may be applied to the angularly inclined ends of the plastic frame molding members during the initial assembly so that the ends of the frame molding members are held in an abutting relationship by means of the corner blocking members 34 and subsequently secured to one another by means of the adhesive so that the frame molding members will retain their assembled configuration after removal of the sub-frame. This has the advantage that the frame molding members will remain in one piece when the sub-frame is removed to replace the glass or to permit the cleaning of the glass of the picture frame or for other servicing purposes after the assembly of the framed picture or the like.

Various modifications of the present invention will be apparent to those skilled in the art without departing from the scope of the invention. For example, it will be apparent that the picture frame of the present invention may also be used to provide a plastic frame for a mirror or the like and it is not restricted to the use in association with pictures.

In a further modification an additional strut may extend transversely between opposed spacer members centrally of their length to further reinforce the sub-frame.

What I claim as my invention is:

1. A picture frame comprising,
   a. a plurality of plastic frame molding members disposed in an end to end abutting relationship to define the sides of said frame, said plastic frame molding members having a thickness in the range of 0.125 inches to 0.50 inches,
   b. lip means projecting inwardly from said inwardly directed surface of each molding member for supporting a picture thereon,
   c. corner blocking means at each corner of said frame spaced rearwardly from said lip means to secure a picture therebetween, said corner blocking means having a pair of outer support surfaces disposed at right angles to one another,
   d. locking pin means extending through said molding members and releasably engaging said corner block means to releasably secure said molding members with respect to said block means and with respect to one another with the ends of the molding members in said abutting relationship,
   e. said blocking means being rigid and preventing angular deflection of abutting plastic frame molding members.

2. A picture frame as claimed in claim 1 wherein said abutting ends of said frame molding members are inwardly inclined to provide a mitred joint therebetween.

3. A picture frame as claimed in claim 1 wherein each of said corner blocking means is in the form of a wooden block, said outer support surfaces extending in face-to-face contact with said adjacent plastic frame molding members, said locking means consisting of a plurality of wood screws.

4. A picture frame as claimed in claim 1 wherein each of said corner blocking means comprises a metal frame which has a pair of legs, each of which has an L-shaped cross-section, one arm of said L-shaped cross-section being disposed in a face-to-face relationship with respect to said frame molding means and the other arm thereof projecting inwardly of said frame, said other arms being connected to one another at their inner ends to render said blocking means rigid with respect to angular deflection of said legs with respect to one another.

5. A picture frame as claimed in claim 4 wherein each of said legs of said metal frame has a flange member at the outer end thereof, and spacer bar means extending between the flanges at the outer ends of adjacent corner blocking means and means for securing said spacer bar means with respect to said flange means.

6. A picture frame as claimed in claim 1 including spacer bar means extending between adjacent corner blocking means, said spacer bar means each having a side face disposed in a face-to-face relationship with respect to a frame molding member and means for securing opposite ends of said spacer bar means with respect to outwardly directed ends of said corner blocking means.

7. A picture frame as claimed in claim 6 wherein said ends of said spacer bars and said outwardly directed ends of said corner blocking means abut in a plane which is normal to the plane of the adjacent frame molding members.

8. A picture frame as claimed in claim 6 wherein said ends of said spacer bars and said outwardly directed ends of said corner blocking means abut in a plane which is angularly inclined to form a mitred joint therebetween.

9. A picture frame as claimed in claim 6 wherein the outwardly directed ends of said corner blocking means are rebated to receive the ends of said spacer bar means.

10. A picture frame as claimed in claim 6, including nail means connecting the outwardly directed ends of said corner blocking means to said spacer bar means.

* * * * *